J. HANSON.
APPARATUS FOR TREATING STANDING GRAIN.
APPLICATION FILED NOV. 25, 1918.

1,303,659.

Patented May 13, 1919.
2 SHEETS—SHEET 1.

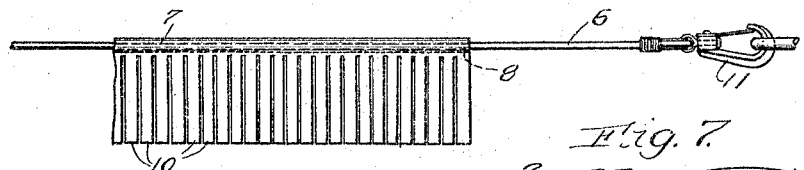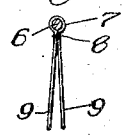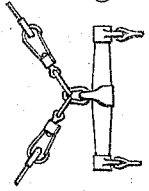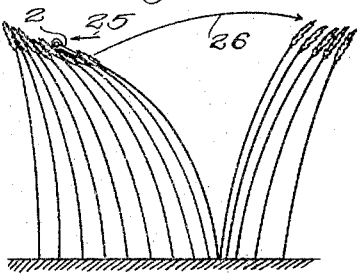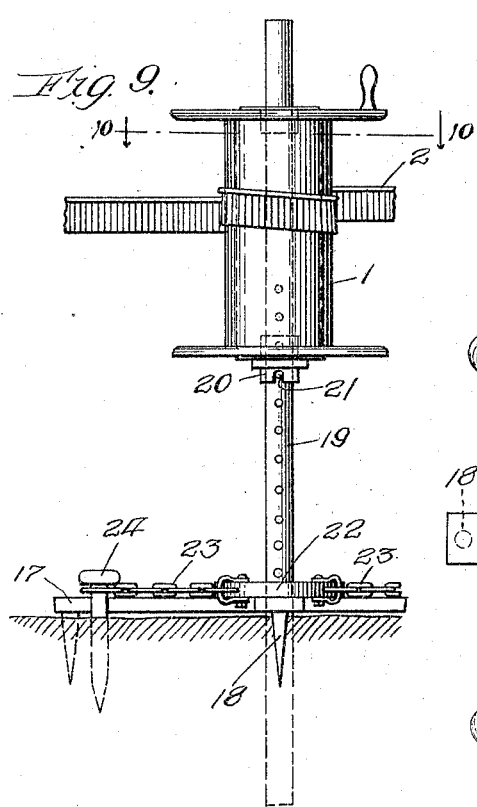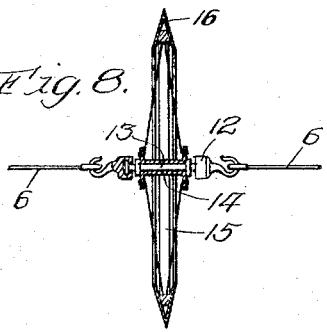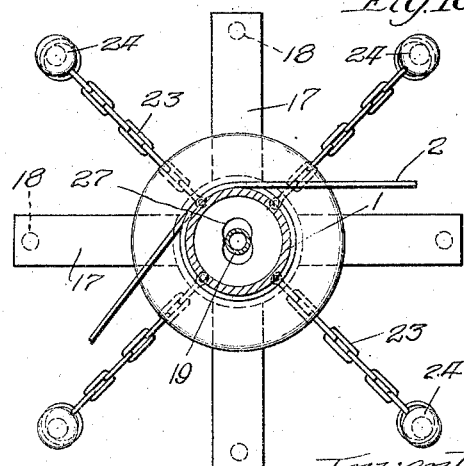

UNITED STATES PATENT OFFICE.

JOHANNES HANSON, OF MONTEVIDEO, MINNESOTA.

APPARATUS FOR TREATING STANDING GRAIN.

1,303,659. Specification of Letters Patent. Patented May 13, 1919.

Original application filed July 30, 1917, Serial No. 183,410. Divided and this application filed November 25, 1918. Serial No. 264,040.

*To all whom it may concern:*

Be it known that I, JOHANNES HANSON, a citizen of the United States, residing at Montevideo, in the county of Chippewa and State of Minnesota, have invented a certain new and useful Apparatus for Treating Standing Grain, of which the following is a specification.

This invention relates to mechanism for the treatment of standing grain for the purpose of preventing injury thereto by rust, frost, and other injurious causes, and has for its object the increasing of the amount and the betterment of the quality of grain produced. This application is a division of my prior application, Serial No. 183,410, filed July 30, 1917, in so far as the subject-matter of the present application is disclosed in the prior one.

The invention is exemplified in the combination and arrangement of parts described in the following specification and illustrated in the accompanying drawings, and it is more particularly pointed out in the appended claims.

In the drawings—

Fig. 4 is a side elevation; and

Fig. 5 is a cross-sectional view of a part of the apparatus in one embodiment of the invention.

Fig. 6 is a detail showing one method of attaching a draft-animal to the part of the apparatus shown in Fig. 4.

Fig. 7 illustrates in detail the method of applying the invention to standing grain.

Fig. 8 shows a runner or traveling support which may be used in connection with the application of the invention shown in Fig. 2.

Fig. 9 is an elevational view of a drum forming a part of one embodiment of the invention when applied in the manner shown in Fig. 1; and Fig. 10 is a horizontal sectional view on line 10—10 of Fig. 9.

It is well known to persons familiar with the production of small grain, such as wheat, oats, barley, rye, hemp, corn, etc., that every year the crop is injured both in quantity and quality by the ravages of the disease known as rust, and also, especially in the North, by the effects of early frost. There are a number of varieties of rust which affect grain, among which is the black rust, which is principally confined to the heads of the grain, and the red or stem rust which affects a large part of the stalk or straw. The development of rust on the grain varies from year to year, depending largely upon weather conditions. If there happens to be a period of wet weather, accompanied by high temperature at the time that the kernels are forming in the heads of the grain, the crop is liable to be very seriously affected. The development of the rust depends very largely upon the moisture which adheres to the head and the stalk of the grain during hot weather. The rain fall itself is not particularly conducive of rust development since the force of the falling rain prevents the water from adhering to a great extent to the stalks of grain, and tends to wash the stalks clean of the spores of rust. For the same reason rust is not so prevalent in windy weather. The greatest cause of rust development is the formation of dew upon the stalks of grain, which occurs principally in still weather, and if any dew remains upon the grain on a warm morning until it dries naturally, the proper conditions are produced for the best development of the rust disease, and if this takes place for two or three days in succession, when the grain is in the most susceptible stage, the crop is almost sure to be seriously damaged, if not destroyed, in many instances. My invention contemplates the removal of this moisture from the grain, together with the developing spores of the rust disease before the rust has time to develop sufficiently to produce injury. In order for such treatment to be effective, it is apparent that it must be carried out quickly, and for this reason I have devised a means by which a large tract of grain may be treated in a very short time.

Figure 1:
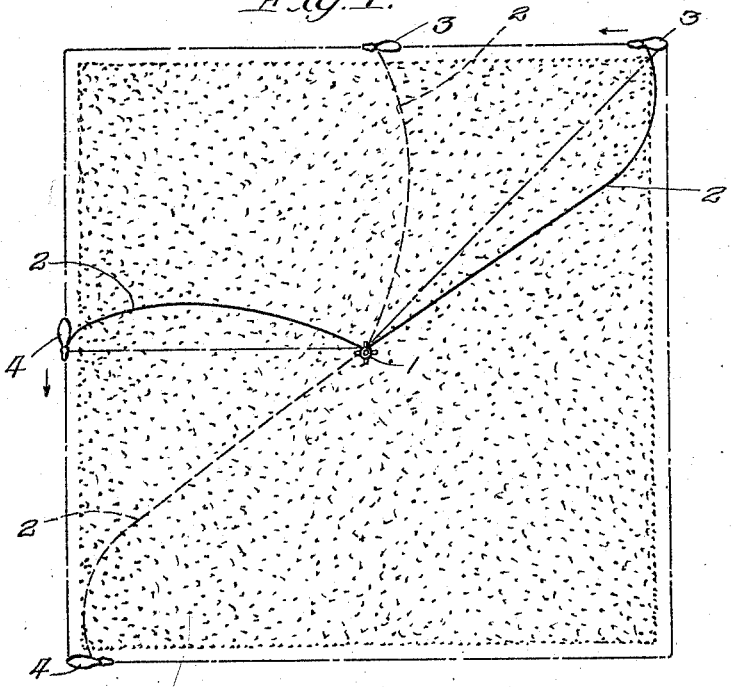
Figure 1 is a plan view of a field of grain being subjected to treatment according to the present invention.
Figure 2:
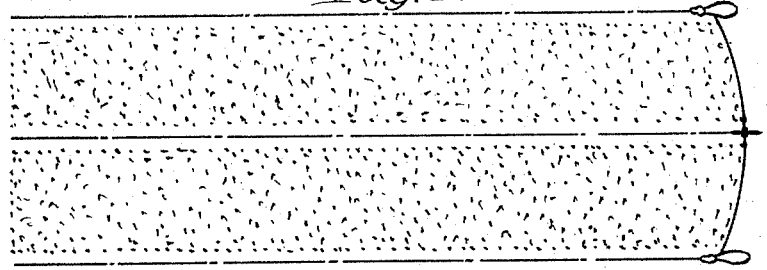
Fig. 2 is a similar view of a field of grain of somewhat different shape and illustrates a somewhat different manner of practising the invention.
Figure 3:
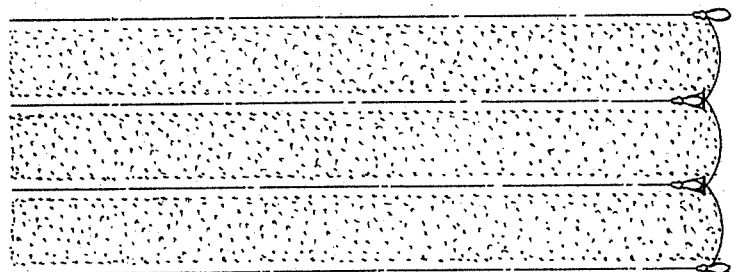
Fig. 3 is a view similar to Fig. 2, but illustrates a still further modification of the method.

In Fig. 1 I have represented diagrammatically a field of standing grain, which may be of any size, it being possible to treat easily a quarter section in the manner shown in this figure. In practising the invention, a rotary drum, such as is shown at 1 in Fig. 9 of the drawings, is located in the center of
the field, and a flexible cable 2 is given a single turn about the drum, as shown also in
Fig. 9. One end of the cable is carried to
the boundary of the tract at one corner
thereof and secured to a draft-animal shown
at 3 in Fig. 1. The other end of the cable is
carried to the middle of one side of the tract
and secured to a second draft-animal 4. The
cable is preferably given a slight amount of
slack as shown in the drawings. The animals are now driven along the boundary line
of the tract in the direction of the arrows,
and as they move forward it is apparent that
the cable 2 will move about the drum 1 to
compensate for the change in the distances
between the animals and the drum. While
the animal 4 is moving farther away from the
drum, the animal 3 will be drawing nearer
so that the total amount of cable required
will be constant, although the amounts on
opposite sides of the drum will vary. At
the starting point, shown in full lines in Fig.
1, the amount of cable drawn by the animal
3 will be at its maximum, while the amount
drawn by the animal 4 will be at a minimum,
but when the animals reach the position
shown in broken lines in the figure, the condition will be reversed, and the animal 4 will
be drawing a maximum amount of cable.
If the field of grain is a comparatively long
narrow one, it may be more economical to
hitch a pair of animals to opposite ends of
a cable of sufficient length to reach across the
entire width of the field, as shown in Fig. 2.
In this way the entire field is covered by the
passage of the animals once along the border. If found desirable the cable may be
supported intermediate its length by a traveling support 5, one form of device suitable
for this purpose being shown in Fig. 8 of the
drawings. If the field is too wide for a
single length of cable, a plurality of
lengths may be used, as shown in Fig. 3, in
which case one or more of the animals must
travel through the standing grain. It may
be found desirable where a treatment of this
kind is contemplated to leave a narrow strip
unseeded for this purpose.

A great variety of forms of cable may be
used for the purpose of my invention, such
as smooth or twisted wire, rope, chains, etc.
A good form of cable for the purpose is
shown in Fig. 4 of the drawings, in which
the cable proper is designated by the numeral 6, and may be a twisted strand of wire
such as is sometimes used for clothes-line
wire, or it may be a plain strand, or a rope,
or other form of cable. A light rod may
also be employed for this purpose. A piece
of canvas 7 is doubled about the cable and
stitched, as shown at 8 in the drawings, to
hold it in place. The depending flaps 9 are
slit into strips 10 which form a fringe or
wiper for clearing the grain of moisture, the
length of the fringe being varied to suit
conditions. It is, of course, understood that
such a fringe may be formed in a great variety of ways, the one mentioned being shown
by way of illustration. Another effective
form of cable is one in which a strip or strips
of fabric is twisted together with the strands
of a twisted cable so that the edges of the
strips of fabric will extend outwardly from
the cable. In some cases it may be desirable
to use a simple cover of pliable material to
prevent the cable from injuring the stalks.
Many forms of cable will suggest themselves,
and I do not wish to confine myself to any
particular form. The end of the strand is
preferably attached to the draft-animal by
a swivel hook 11 which may be snapped to
the hame or bellyband, or may be secured to
the whiffletree. The position of the attachment will depend somewhat upon the manner of carrying out the process and upon the
height of the grain. If the animal is drawing the end of a single cable it is preferable
to attach the cable to the side of the harness, such as to the hame, while if the animal
is drawing the ends of two cables, as shown
in Fig. 3, it is better to secure both cables to
a whiffletree in the manner illustrated in Fig.
6. I prefer to use a swivel hook for this
purpose to overcome twisting of the cable.

The runner or support for the middle portions of the cable may be of a variety of
forms, one of which is shown in Fig. 8. In
this figure a wheel is shown for supporting
the cable 6 intermediate its ends, the cable being carried by swivel hooks 12 secured to opposite ends of the axle 13 on which the hub
14 of the wheel is journaled. The hub 14 is
connected by light spokes 15 with a V-shaped tread 16. The tension on the cable
holds the wheel in its vertical position and
the V-shaped tread permits the wheel to pass
through the standing grain without breaking
any appreciable number of stalks. If desired a pair of wheels like the one shown in
the figure, but spaced-apart on a common
spindle, may be employed, and other forms
of runner supports will suggest themselves
to those skilled in the art.

The drum 1 for supporting the middle
portion of the cable used on square fields may
be of a very simple construction, one form
being illustrated in Fig. 9. In this form a
laterally extending base 17 is provided with
stakes 18, which are driven into the ground
to hold the drum in place, and an upright
standard 19, which may be a plain piece of
iron pipe, forms the spindle on which the
drum 1 is mounted. The drum is supported
by a collar 20 adjustably held in place on the
standard 19 by a pin 21. The standard 19
passes through a plate 22 secured to the top
of the base 17, and the standard may be
driven to some distance into the ground.
The plate 22 is provided with anchor chains 23 held in place by stakes 24 to withstand the strain placed upon the standard 19 by the tension in the cable 6. Where the standard 19 passes through the ends of the drum 1 openings are preferably provided which are not true circles, but are formed rather of two circular openings overlapping and having their centers spaced slightly apart. The shape of the opening thus formed is shown at 27 in Fig. 10. As the drum is rotated by the movement of the cable 6 the oblong bearing openings for the standard will impart a vibration to the drum which will be transmitted to the cable. This vibration will assist in shaking the dew from the grain and throwing the dew thus dislodged away from the heads and stalks.

Fig. 7 illustrates diagrammatically the effect of the cable as it is drawn across a field of standing grain. In this figure the cable 2 is moving in the direction of the arrow 25, and the stalks of grain are bent in the direction in which the cable moves. The cable is supported or floated upon the bending stalks, and as it passes over them it wipes away the clinging dew. As the cable passes off the stalks of grain in succession, each stalk as it is freed from the cable springs backwardly in the direction of the arrow 26 of the drawing, and thus any moisture which is not removed by the cable itself is thrown from the stalk by its springing return movement. In this way the moisture necessary for the development of the rust spores is removed, and not only is the grain freed from the moisture itself, but the moisture carries with it the greater portion of the rust spores, and thus the ravages of the disease are prevented. Usually the passage of the cable across the field in a single direction is sufficient, but if it is found after such a treatment there is still moisture clinging to the grain, the cable may be drawn back across the field in a reverse direction, and thus assurance may be made doubly sure.

The effect of an early frost upon standing grain may be overcome by treating the grain in the manner described whenever the temperature comes dangerously near the freezing point. The passage of the strand or cable over the grain removes the moisture and frost as it forms on the exterior of the grain while the natural heat of the earth sustains circulation within the stalk, and if the treatment is begun in the early morning and continued until the danger is past, an entire crop may be saved by the small amount of labor necessary to apply the process to the grain.

I claim:

1. The combination with a line, of means secured to the ends of said line for drawing said line across a field of standing grain, and means for supporting said line intermediate the ends thereof.

2. The combination with a line, of means for drawing said line across a field of standing grain, and a rotary drum for supporting said line intermediate the ends thereof.

3. The combination with a line, of means attached to the ends of said line for drawing said line across a field of standing grain, and an upright drum about which said line is passed for supporting said line intermediate the ends thereof.

4. The combination with a line, of a drum about which said line passes, a spindle for supporting said drum to rotate about an upright axis, and means secured to the ends of said line for drawing said line across a field of grain and for moving said line longitudinally relative to said drum.

5. The combination with a line, of a drum about which said line passes, a spindle for supporting said drum to rotate about an upright axis, means for anchoring said spindle to withstand the strains imparted to said drum by said line, means secured to the ends of said line for drawing said line across a field of standing grain and for moving said line longitudinally relative to said drum, and means for vibrating said drum and line when said drum is rotated by said line.

6. The combination with a line having wiping material secured thereto, of means for drawing said line across a field of standing grain, and means for supporting said line intermediate the ends thereof.

7. The combination with a line having wiping material secured thereto, of a drum about which said line passes, a standard for supporting said drum for rotation about an upright axis, anchoring means for holding said standard against the tension in said line, means for adjusting said drum vertically upon said standard, means for imparting vibration to said drum and line when said drum is rotated, and means secured to the ends of said line for drawing said line across a field of standing grain and for moving said line longitudinally thereof relative to said drum.

8. The combination with a drum, of a standard for supporting said drum for rotation about an upright axis, means for anchoring said standard, a line passing about said drum, and means for attaching a source of motive power to the ends of said line so that said line may be drawn in a transverse direction to said line and also longitudinally thereof while supported intermediate its ends by said drum.

In testimony whereof I have signed my name to this specification on this 14th day of November, A. D. 1918.

JOHANNES HANSON.

Copies of this patent may be obtained for five cents each, by addressing the "Commissioner of Patents, Washington, D. C."